Dec. 22, 1942.    J. D. KREIS    2,306,258
FISHING REEL
Filed May 9, 1940    3 Sheets-Sheet 1
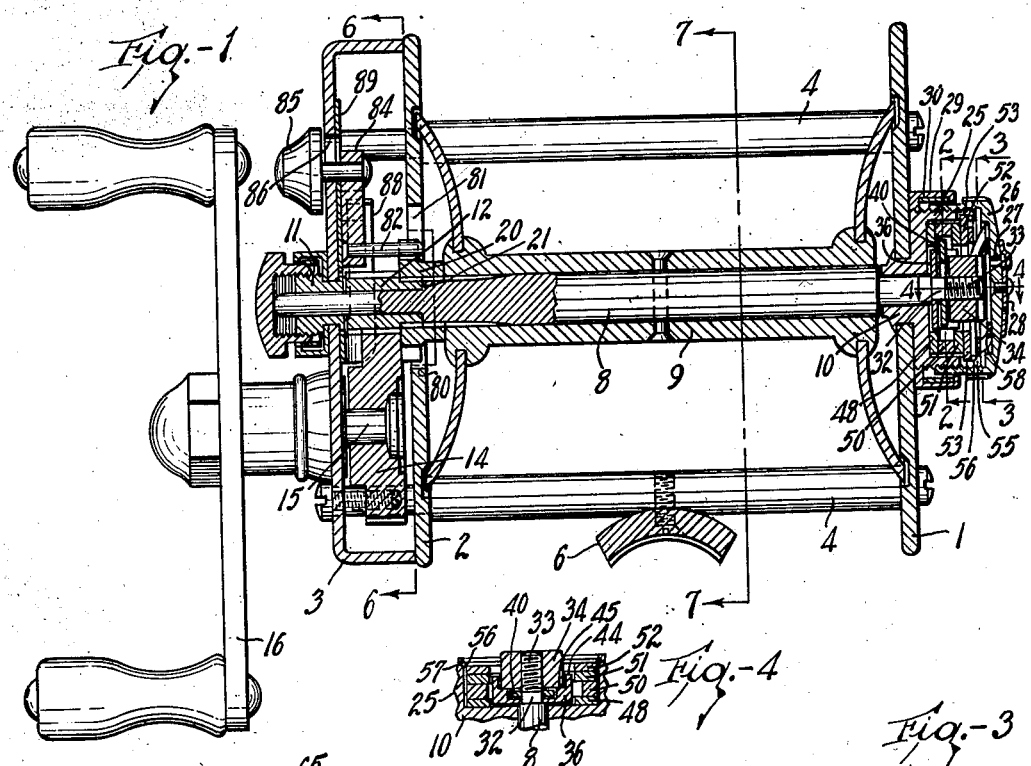
INVENTOR
JOSEPH D. KREIS
BY Ely & Frye
ATTORNEYS Dec. 22, 1942.   J. D. KREIS   2,306,258
FISHING REEL
Filed May 9, 1940   3 Sheets-Sheet 2

INVENTOR
JOSEPH D. KREIS

BY Ely & Frye

ATTORNEYS

Dec. 22, 1942.  J. D. KREIS  2,306,258
FISHING REEL
Filed May 9, 1940  3 Sheets-Sheet 3
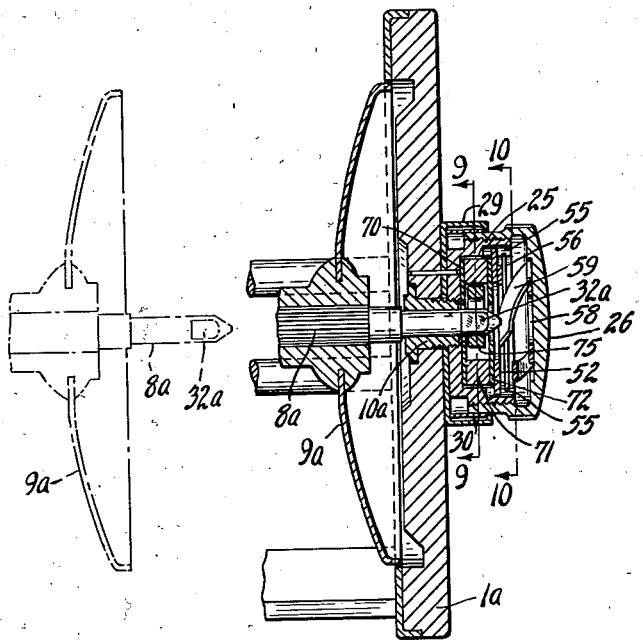
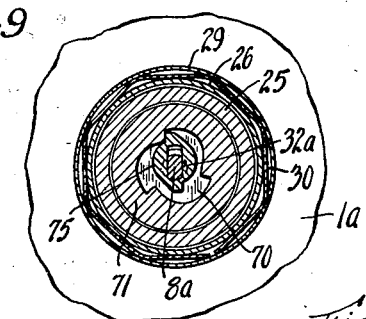
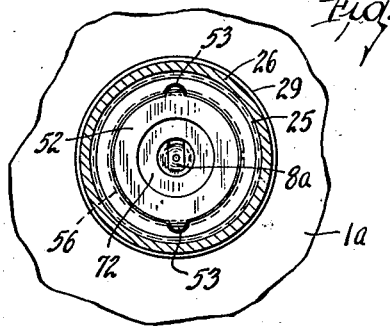
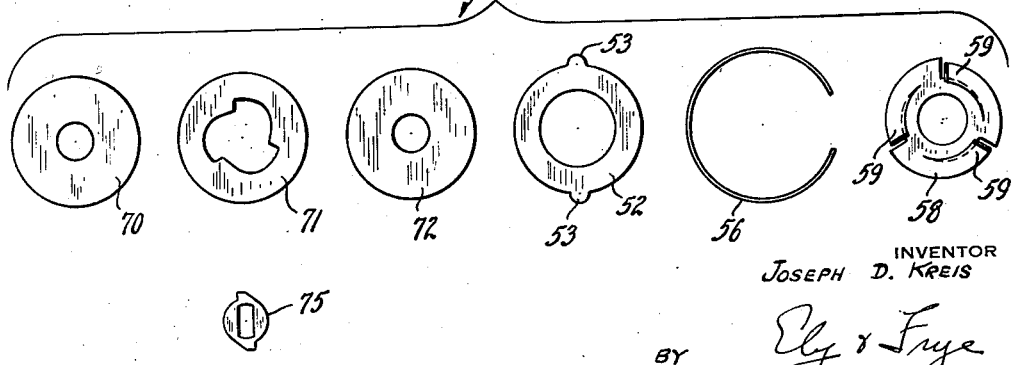
INVENTOR
JOSEPH D. KREIS
BY
ATTORNEYS Patented Dec. 22, 1942

2,306,258

UNITED STATES PATENT OFFICE 2,306,258

FISHING REEL

Joseph D. Kreis, Cleveland Heights, Ohio, assignor to The Enterprise Manufacturing Company, Akron, Ohio, a corporation of Ohio Application May 9, 1940, Serial No. 334,183

10 Claims. (Cl. 242—84.5)

The present invention relates to fishing reels of the type generally employed for bait casting and in the design of an efficient drag mechanism attached to the end plate of the reel, so that an effective drag or anti-back-lash can be applied to the spool in one direction only. The drag is so constructed and designed that it will be released when the spool is rotated in the opposite direction. By means of the device it is possible to apply a definite and finely adjusted drag to the spool when the line is being unwound, but when the line is being reeled in the drag will be wholly released.

The drag mechanism is constructed and designed so that it may be adjusted with a fine degree of precision and accuracy and serves as an effective anti-back-lash attachment in casting. It may also be adjusted so as to exert a substantial drag such as may be used in playing large or game fish. In the forms of drag mechanism shown herein, the entire drag mechanism is located on the outside of the back plate of the reel, and can not only be readily and accurately adjusted while the reel is in operation, but is accessible for cleaning and repairing without disassembling the reel structure. This is a considerable advantage as the drag mechanism requires frequent oiling and repair which can be given to it without taking apart any of the remainder of the reel structure. In fact the entire drag mechanism may be removed without affecting the other parts of the reel and the reel can be used as a fishing reel minus the drag mechanism.

In a modification of the invention it is also possible to remove the spool from the drag mechanism without disassembling the drag mechanism, and this is particularly desirable in the so-called "take-apart" reels because the drag mechanism and the balance of the reel are independent and either may be separated from the other for individual repairs and attention.

There is also shown and described herein a new form of click mechanism and the adaptation of the click ratchet so that it also serves as a coupling between the drive pinion and the spool. These improvements are the subject of divisional application Serial No. 377,473, filed Feb. 5, 1941.

In respect to the drag mechanism itself, the invention is an improvement upon the drag mechanism shown in the application of Walter L. Adams, Serial No. 275,412, filed May 24, 1939, it being the object to redesign and reconstruct the drag mechanism so that it will be more compact for adaptation to bait casting reels. Certain changes over the original Adams conception have been made to give stronger and more efficient action, and to simplify and reduce the number of parts without sacrificing the advantages and effectiveness of the Adams conception. One of the advantages obtained by the present invention is the provision of means to hold the drag mechanism in position when the outer cap is removed for inspection of the interior thereof.

Other advantages and benefits will be realized from the disclosures contained herein, it being understood that the forms of the invention shown are the best known and preferred forms, but changes and modifications may be made therein without departing from the spirit and scope of the invention.

In the drawings:

Figure 1 is a view of a bait casting reel having the various improvements incorporated therewith, the view being a section through the axis of the spool shaft, substantially on line 1—1 of Fig. 6;

Figure 2 is a section through the drag mechanism on the line 2—2 of Fig. 1;

Figure 3 is a section through the drag mechanism on the line 3—3 of Fig. 1;

Figure 4 is a section on the line 4—4 of Fig. 1;

Figure 5 is a composite view of the several elements of the drag mechanism and clutch therefor removed from the casing or housing in which they are retained on the reel structure;

Figure 8 is a view of the back plate of the reel showing the modification by which the spool is removable from the drag mechanism without disassembling the latter. This view also shows a modified form of the clutch mechanism by which these parts are strengthened and improved;

Figure 9 is a section on the line 9—9 of Fig. 8;

Figure 10 is a section on the line 10—10 of Fig. 8; and

Figure 11 is a view similar to Fig. 5 of this modification of the drag and clutch mechanisms.

Figure 6:
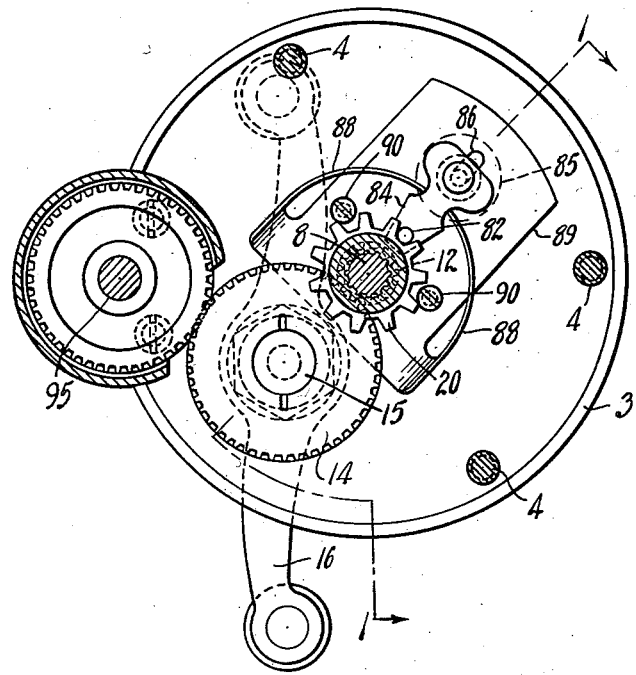
Figure 6 is a section on the line 6—6 of Fig. 1 showing the improved click mechanism.
Figure 7:
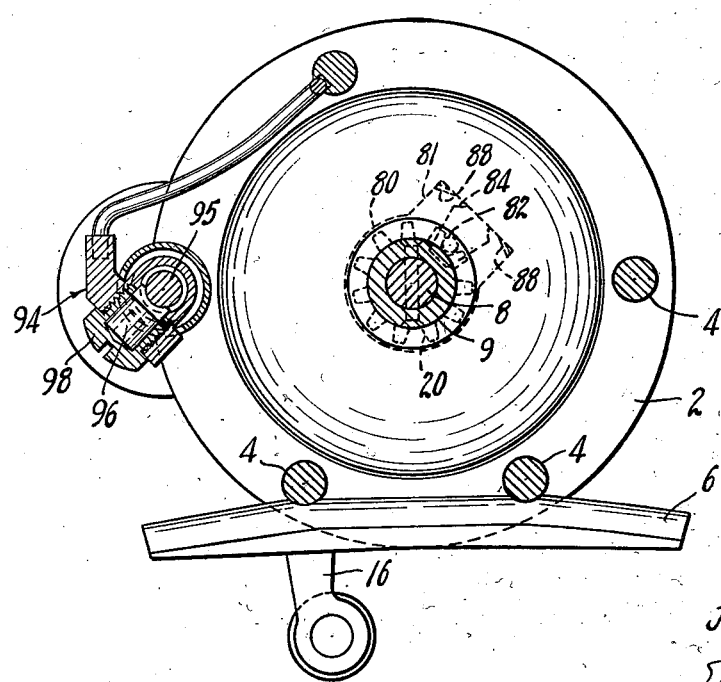
Figure 7 is a section on the line 7—7 of Fig. 1 showing the level wind carriage.

Referring to Fig. 1, the rear or back plate of the reel of the bait-casting type is marked 1, the front plate as 2, and the gear casing as 3. These elements of the reel are held together by the usual posts 4, and the usual screws to maintain the reel in assembled condition, a plate 6 being provided for mounting the reel upon the rod.

The main spool shaft 8 carrying the spool 9 is mounted in a bearing 10 in the back plate and a bearing 11 in the gear casing and is driven through a pinion 12 fitted over the end of the shaft from the main driving gear 14 mounted upon the stub shaft 15 in the gear housing and driven by the crank 16.

The means for securing the pinion 12 to the spool shaft 8 is one of the features of the invention and is designed to improve upon the usual construction employed at this point. In the ordinary reel the pinion, which is removable from the end of the shaft, is usually cut transversely to provide teeth or projections which fit over a rib formed on the spool shaft, but the connection is unsatisfactory because the teeth break off easily. In the improved means for coupling the shaft and pinion, as shown herein, the click ratchet 20 is employed as a coupling or retaining ring connecting the pinion 12 and the spool shaft 8. This is a novel adaptation of the click ratchet which, in the design of reel shown is located in the front end of the reel and is so constructed that it is employed as a coupling for the spool and the removable pinion which drives it.

The pinion 12 is received over the reduced end of the shaft 8 and rests against the shoulder 21 on the shaft. The main body of the shaft and the adjacent end of the pinion 12 are provided with a plurality of aligned grooves or teeth (see Fig. 6). The click ratchet spans both members and is provided with a plurality of mating teeth which engage with the grooves or teeth on the other members, and as the click ratchet is of substantial depth and engages both members over approximately one half of its depth, the arrangement affords a stronger and more secure coupling between the spool and its pinion than has been possible with earlier reel constructions.

Referring now to the drag or anti-back-lash mechanism, for it is effective for either purpose, it will be noted that in either the preferred or modified form the mechanism is located entirely on the outside of the back plate 1 being carried in a circular housing or chamber 25 desirably formed as a part of the bearing 10. The exterior of the housing is screw threaded to receive the cap 26 which when removed exposes the interior of the chamber so that every part of the friction or drag mechanism may be removed for the purposes stated above. An oiling port 27 covered by plate 28 may be provided on the cap and surrounding the housing may be located a flanged ring 29 carying a spring retainer 30 bearing upon the lower end of the cap and serving to prevent its loss. The degree to which the cap is run down on the housing also serves to adjust the friction exerted by the drag or anti-back-lash mechanism in the housing.

The end of the shaft 8 which projects within the chamber of the housing is formed with a squared portion 32 (Figs. 2 and 4) and the extremity of the shaft is screw threaded at 33 to receive a retaining cap-screw 34. Seated over the squared portion 32 is a cup 36 having a centrally located square hole 37 to form a driving connection with the shaft. Across the outer face of the cup is a transverse groove or channel 38 designed to receive a reciprocating dog 40 which acts as one member of the clutch between the spool shaft and the drag mechanism. The center of the dog is provided with the elongated flat sided opening 41 which also engages the square portion 32 of the shaft 8. At the sides of the channel 38 the cup 36 is provided with the arc shaped walls 44 and with the oppositely positioned steps or lands 45 which are slightly higher than the thickness of the dog 40 so that as the cap screw 34 is screwed into place it will come to rest at a point which permits the free reciprocation of the dog in its channel.

Surrounding the cup 36 are a thin disk 48 of friction material usually of phosphor-bronze, a ratchet ring or cage 50 which forms the companion coupling member for the dog 40, a second friction disk 51 and a feathered disk 52 having wings or extensions 53 to engage and slide in grooves 55 cut in diametrically opposite positions in the inner wall of the housing 25. Ring 52 is thus non-rotatable in the housing and affords a stationary friction surface in addition to the bottom surface of the housing, but which is movable axially in the housing under the influence of the cap to secure the variable degrees of frictional resistance to the rotation of the spool by which the anti-back-lash or drag effects are produced at the desire of the fisherman.

On the top of the ring 52 is located a light wire split ring 56 which is adapted to be sprung into expanded position engaging the inner wall of the housing to hold the removable elements in position when the cap is removed. The inner wall of the housing may be provided with a shallow groove, as shown at 57 in Fig. 4 to hold the split spring ring in position. This permits the cap 26 to be removed without loss of the loose parts which constitute the friction and clutch mechanism.

A yielding spring pressure is applied to the several elements of the friction device, by a spring device interposed between the inner surface of the cap 26 and the ring 52. In the form shown this is a spring metal disk 58 formed with a plurality of downwardly bent spring fingers 59 which bear at spaced points on the ring 52. Three fingers are shown which evenly distribute the pressure applied by the cap about the ring and insure the fine and balanced application of friction such as is needed to cause the mechanism to act as an efficient anti-back-lash device. The number of the fingers can be varied; three or more will prevent any localization of the friction and ensure even application of the retarding effect of the friction elements. The spring disk may be loose as shown or may be attached to the interior of the cap 26. As the cap is advanced or retracted the friction resistance is increased or decreased so that a wide range of frictional resistance can be obtained, the disk 52 moving axially in the housing but remaining in non-rotative relation thereto.

Referirng now to the clutch mechanism by which the drag or anti-back-lash is effective only in one direction of rotation, it will be observed that this device is effective when the line is being run out. It thus serves to effect a sufficient drag, when lightly adjusted, to prevent over-running of the spool while casting the bait and obviates a common cause for snarls and back-lashes while casting. If set more strongly, the device will act as a drag against the running of the fish, and the change may be effected by simply turning the cap 26 in the proper direction while the reel is being used in fishing.

The clutch consists of the dog 40 previously referred to and the cage or ring 50 the former having a tooth 65 on either end, one face of which extends substantially radially from the dog and the other face of which is inclined as shown. The inner surface of the ring 50 is provided with several, here shown as three, ratchet teeth 66, likewise with radial and sloping surfaces, the radial surfaces on the dog and the interior of the cage being designed to contact when the spool is rotated in the direction to pay off the line so that the spool and the cage are interlocked, and friction resistance to the spool rotation is thus applied between the ring 50 and the under-surface of the housing 25 and the washer 52 feathered thereon. In the opposite direction the inclined surfaces of the teeth ride over one another and the spool is free to rotate. The elongated slot 41 in the dog permits it to shuttle back and forth freely when the spool is being rotated in the direction to wind in the line. In reverse, however, the inclined surfaces will move the flat or radial surfaces of the dog and cage or ring 50 into engagement.

When the clutch is active the rotation of the spool will be retarded through the friction rings 48 and 51 to the extent to which pressure is exerted between the two surfaces of the cage 50 and the facing surfaces of the housing and ring 52.

It will be noted that by squaring the shaft and slotting the dog, the shaft is not weakened as it would be if a passage for the dog were put through the shaft. Also that a thin flat dog such as here provided makes a very compact structure without sacrifice of its efficiency.

Referring now to the form of clutch and drag mechanism shown in Figs. 8 to 11, inclusive, it will be seen that still further improvements have been made which simplify the construction and secure advantages not present in the Adams device referred to or in the form shown in Figs. 1 to 5.

In the earlier forms it is necessary to disassemble the drag mechanism in whole or in part in order to remove the spool, but in the form now under discussion, the spool may be removed without touching the drag mechanism. This is an especial advantage in the so-called takeapart reels as it permits the fisherman to make repairs, or to service either part of the reel without disassembling any other part of the reel. The design shown in these figures also reduces the number of parts as will be seen from a comparison of Figs. 5 and 11.

In Fig. 8 the rear end plate of the reel is designated at 1a, the spool as 9a and its shaft as 8a. The end of the spool shaft is formed with the flattened surfaces 32a and is rotated in the bushing 10a. It may be removed by endwise displacement as shown in dotted lines in Fig. 8 without disturbing the drag mechanism, and as the drag mechanism is entirely self-contained no part thereof is displaced.

In the detailed description of the drag mechanism the housing 25, cap 26 and the ring 29 and spring 30 are not altered. Within the drag mechanism the friction disk 70 next to the bottom of the housing and the friction disk 72 above the ratchet cage or ring 71 are formed with relatively small openings so that the surfaces of these rings will retain the sliding dog in position. The ring 71 is also formed differently, having a smaller central opening so that it is stronger, and the dog 75 is substantially circular in form for added strength. The parts 52, 56 and 59 are the same as in the form shown in Figs. 1 to 5, it being noted that no cap screw such as shown at 34 is required for this assembly, and therefore it is not necessary to touch the drag mechanism in order to remove the spool endwise as shown by the dotted lines.

Referring particularly to Figs. 1 and 6, the new form of click mechanism will be described, it being noted that the location of the click pinion and its use as a coupling between the spool and its drive pinion has been described. This places the click pinion in the plane of the front end plate 2 where an enlarged recess 80 is provided to receive it, said recess being formed with a further cut out portion 81 to afford movement to the click pin. This pin is shown at 82 and is carried on the sliding block 84 mounted on the inside wall of the gear casing, being moved into and out of clicking position by the knob 85 working in slot 86 in the gear casing. It will be seen that in order to accommodate the click mechanism in the gear casing it has been necessary to make a new arrangement of the parts of the reel and to extend the pin outwardly from its block and into the recess in the end plate 2.

The block 84 is shown in Fig. 6, being pivoted on the shank of the knob 85 and yieldingly held in neutral position by the long curved spring arms 88 which are bent upwardly and formed as a part of the plate 89 which lies beneath the block and is attached to the gear casing by rivets 90.

The level wind carriage is of the usual construction and is indicated at 94 being driven back and forth by the usual double-threaded shaft 95. The half nut which engages the shaft is indicated at 96 and is mounted in the recess in the carriage, being retained in position by a cap screw 98.

The foregoing has described the best known and preferred forms of the invention but it will be appreciated that other forms and modifications may be resorted to without departing from the principles of the invention as set forth in the appended claims.

What is claimed is:

1. In a fishing reel, a reel frame, a spool, a mechanism associated with the reel frame to exert frictional resistance to the spool rotation comprising a spool shaft having a flattened external area, a dog movable transversely of the shaft and having a sliding, non-rotative engagement with the shaft at the flattened area, a ring surrounding the dog, said dog and ring being provided with means to lock them in one direction of rotation only, and frictional means to retard the rotation of the ring.

2. A fishing reel having a frame and means for retarding the free rotation of the spool in one direction only comprising a spool and a spool shaft, the spool shaft having an exterior flattened area, a reciprocating dog received over the spool shaft and having a rectangular opening providing a non-rotatable connection with the flattened area, a ring surrounding the dog and having ratchet teeth engageable by the ends of the dog, and friction means locked to the frame and bearing on opposite sides of the ring.

3. A fishing reel having a frame and means for retarding the free rotation of the spool in one direction only comprising a spool and a spool shaft, the spool shaft having an exterior flattened area, a reciprocating dog received over the spool shaft and having a rectangular opening providing a non-rotatable connection with the flattened area, a ring surrounding the dog and having ratchet teeth engageable by the ends of the dog, friction means locked to the frame and bearing on opposite sides of the ring, and means to vary the frictional resistance acting upon the ring.

4. In a bait casting fishing reel, an anti-backlash device comprising a reel frame end plate, a housing on the exterior of the end plate, a rotatable member in the housing, means to frictionally retard the rotation of said member, a spool shaft extending into the housing, means to lock the spool shaft and said member in one direction of rotation only, a removable cap on the housing, and a retaining device associated with the housing to hold the rotatable member and its retarding means within the housing when the cap is removed.

5. In a bait casting fishing reel, an anti-backlash device comprising a reel frame end plate, a housing on the exterior of the end plate, a rotatable member in the housing, means to frictionally retard the rotation of said member, a spool shaft extending into the housing, means to lock the spool shaft and said member in one direction of rotation only, a removable cap on the housing, and an expansible spring member engaging the inner wall of the housing to hold the rotatable member and its retarding means within the housing.

6. In a fishing reel, an end plate, a housing on the exterior of the end plate, a spool, a spool shaft passing through the end plate and into the housing, friction means comprising a plurality of superposed disks to retard the rotation of the spool located in the housing, and means located within the housing to couple the spool shaft with said friction means in one direction of rotation only, the spool shaft and the coupling means being so formed that the spool shaft is withdrawable endwise without disturbing the elements contained in the housing.

7. A fishing reel having an end plate, said end plate having a spool shaft bearing into which the spool shaft may be inserted from one side of the end plate and a housing on the opposite side of the end plate, friction retarding means comprising a plurality of superposed disks located in the housing, and a coupling operative in one direction of rotation only and located within the housing for locking the spool shaft to the retarding means, said spool shaft and coupling being so constructed and arranged that the shaft is removable from said coupling by endwise movement of the spool shaft.

8. A fishing reel having an end plate, said end plate having a spool shaft bearing into which the spool shaft may be inserted from one side of the end plate and a housing on the opposite side of thte end plate, friction retarding means comprising a plurality of superposed disks located in the housing, and a coupling operative in one direction of rotation only and located within the housing for locking the spool shaft to the retarding means, said spool shaft and coupling being so constructed and arranged that the shaft is removable from said coupling by endwise movement of the spool shaft and without disturbing the housing or its contents.

9. In a fishing reel, an end plate, a housing on the exterior of the end plate, a removable cap on the housing, means comprising superposed disks within the housing to exert retarding effect on the spool rotation, a spool and a spool shaft extending into the housing, means to couple the shaft and the retarding means in one direction of spool rotation only, said spool shaft and coupling means being so constructed that the shaft is removable through the end plate without disturbing the contents of the housing, and the contents of the housing are removable therefrom when the cap is removed without disturbing the spool shaft.

10. In a fishing reel, a spool and a spool-shaft, the shaft having a flattened end portion, a dog having a centrally located slot therein engaging the flattened end portion and freely reciprocable transversely thereof, a ring surrounding the dog, said ring and dog having means to interlock for rotation in one direction only, friction means located at either side of the ring engaging the plane surfaces thereof, and means to adjust the pressure exerted upon the ring by said friction means, said shaft and dog being so constructed and arranged that the shaft may be removed from the center of the dog by endwise movement without disturbing the frictional elements or the dog.

JOSEPH D. KREIS.